May 28, 1946. W. V. LOVELL 2,400,869
ELECTROMAGNET
Filed March 14, 1942 2 Sheets-Sheet 1
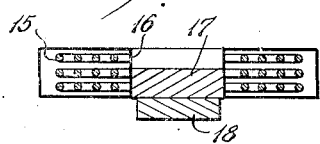
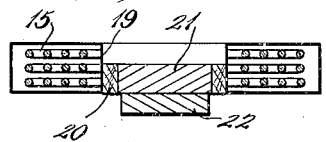
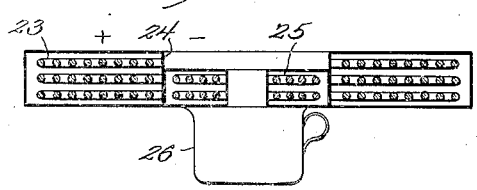
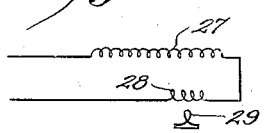
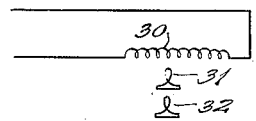
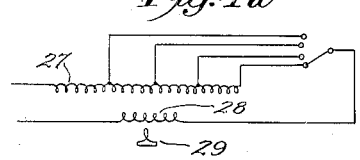
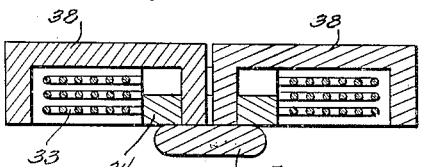
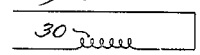
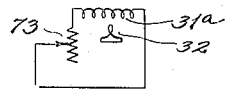
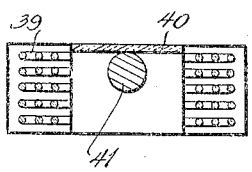
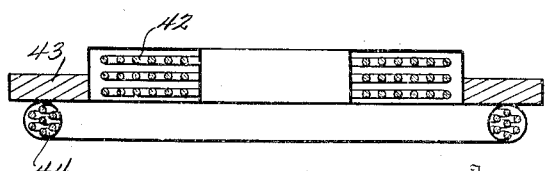
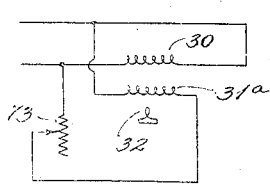
Inventor
William Vail Lovell
By A. D. Adams
Attorney May 28, 1946.  W. V. LOVELL  2,400,869
ELECTROMAGNET
Filed March 14, 1942  2 Sheets-Sheet 2
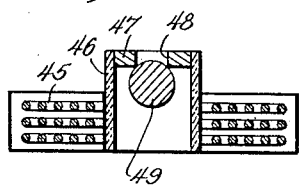
Fig.10
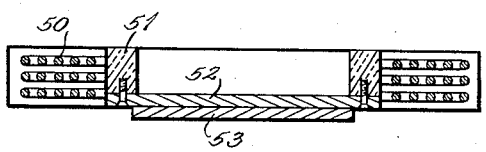
Fig.11
Fig.15
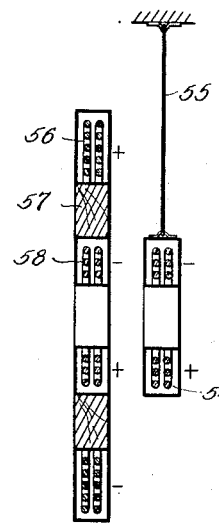
Fig.12
Fig.13
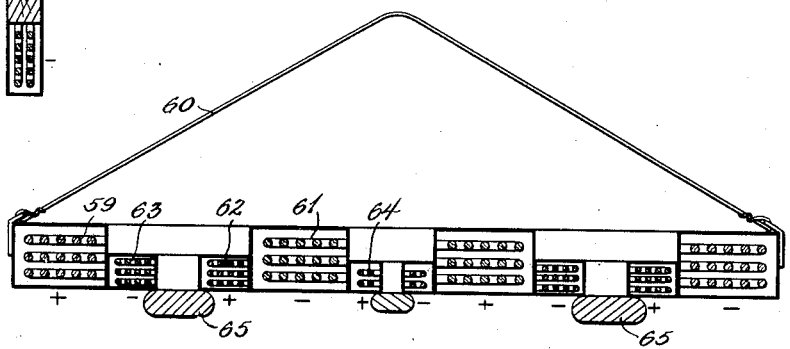
Fig.14
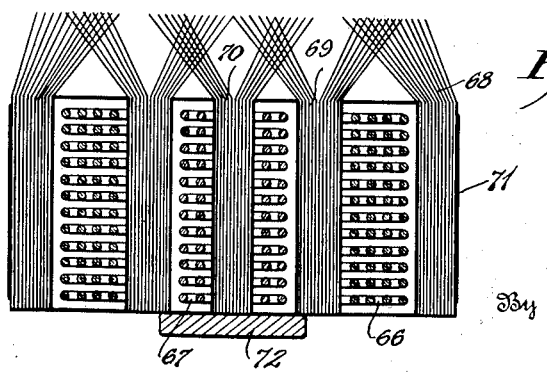
Inventor
William Vail Lovell
By A. D. Adams
Attorney Patented May 28, 1946

2,400,869

UNITED STATES PATENT OFFICE 2,400,869

ELECTROMAGNET

William Vail Lovell, Sanford, Fla.

Application March 14, 1942, Serial No. 434,702

10 Claims. (Cl. 175—338)

This invention relates to an electromagnet for attracting non-magnetic conducting bodies as well as magnetic bodies. The simple magnet and electromagnet are useful and well known devices but are limited in application to bodies possessing the property of being ferro-magnetic, iron being the most common example. In this new device, the scope of the alternating current electromagnet is extended to be effective on a non-magnetic substance, provided that it is in the solid state and a reasonably good conductor of electricity, such as copper, silver, aluminum, gold, etc.

An object of the present invention is to provide an alternating current electromagnet to be used in connection with non-magnetic substances. A further object resides in fixing one closed conductor firmly to a structure of the field producing means to provide an electromagnet which will attract and hold a closed conductor even though it is non-magnetic and at some distance from the field producing means.

An electromagnet capable of moving its armature or other part through a distance and thus perform work, is called a tractive electromagnet; while one devised merely to hold material is styled a portative electromagnet. The device, here disclosed, is essentially a tractive electromagnet, though it may also be employed as a portative magnet. The prior art records a device capable of holding a non-magnetic member placed in contact with the structure.

Further objects will be apparent from the following description, taken in connection with the accompanying drawings, in which:

Figs. 1 to 3 are sectional views of three different electromagnets;

Figs. 4, 4a and 5, 5a and 5b are part wiring diagrams;

Figs. 6 to 11 are sectional views of a number of further modified structures of electromagnets;

Fig. 12 is a sectional view of another modified electromagnet with a part suspended; and Figs. 13 and 14 and 15 are cross-sectional views of three further modified constructions.

It is known that two adjacent conductors carrying like currents are attracted toward each other, and that a conductor carrying current in a magnetic field tends to move toward a region of weaker field. By well known transformer action a closed conductor (a short circuited secondary) in an alternating field of flux has a current induced therein producing a field tending to oppose the exciting field in the region of their common axis. Consequently one conductor (a primary) carrying an alternating current induces such a current in an adjacent closed conductor with which it is inductively coupled, as to cause a force of repulsion between the two conductors. Now if there are two closed conductors (a secondary and a tertiary) placed so as to be subject to the same primary field, the currents induced in the two conductors are substantially in phase and the two conductors are attracted, but both may be repelled from the field or flux source.

The current in the secondary disturbs the field distribution set up by the primary tending to weaken the field near the common axis of the primary and secondary, but to strengthen the field at the boundary of the primary and secondary or in the space between. The two fields may be thought of as having a common axis of symmetry but as being substantially in opposition near that axis. The armature or tertiary also disturbs the field in much the same manner.

In Fig. 1 part 15 is the primary inducing coil and 17 is a mass of conducting metal which may be firmly wedged into the opening 16. This mass, or attractor 17, may completely or partly fill the space or opening 16. The coil 15 may be in sections with taps brought out. A wooden, plastic or porcelain spacer 20, Fig. 2, may be provided in the opening 19 with the attractor 21 as the central mass of metal. The attracted mass or object 18 in Fig. 1 and 22 in Fig. 2 is drawn to the fixed mass 17 and 21 respectively and is in effect a loose tertiary winding, or in the language of electromagnetism, an armature.

Fig. 3 shows an inducing coil 23, a coil 25 as an attractor in the opening 24 instead of a solid mass and the attracted mass is shown as a metal cup 26 of aluminum or the like adhering to the face of the attractor. The coil 25 may be replaced by a solid ring or disk and the attracted mass may be of other shapes of irregular, discoid, spheroid or other configuration.

Fig. 4 is a schematic diagram of connections showing a secondary, 28, as the attractor and a single short circuited turn 29 representing the attracted object. The primary inducing coil is indicated at 27.

Fig. 5 indicates a primary inducing coil 30 and two short circuited turns 31 and 32 one representing the attractor and one the armature.

Fig. 4a shows the same arrangement as Fig. 4 but illustrates that the primary winding 27, or the secondary 28, or both may be provided with taps so as to vary the strengths of the respective coils, and hence affect the distance at which the attractive effect is achieved with an armature of particular dimensions.

Fig. 5a shows the same arrangement as Fig. 5 but illustrates a switch 73 to be open when it is desired to attract only magnetic substances, and closed when the magnet is to attract non-magnetic as well as magnetic substances.

In Fig. 5b the secondary coil is in parallel opposition to the primary through a variable resistance.

Fig. 6 shows an inducing coil 33 and an attractor in the form of a solid ring 34 of conducting material in an opening 35 and having an opening therein through which passes a bundle of iron wires 36 as a core. The bundle 36 is taped together at the top and 37 indicates the attracted mass.

Fig. 7 shows a form of magnet in which the inducing coil is 33, with laminations 38 as a yoke partly enclosing the coil. The attracted mass 37 has an irregular shape and a solid ring 34 is provided in the coil.

Fig. 8 shows a simple coil 39 with a stop or disc 40 rigidly wedged or fastened at the top of the coil. 41 indicates a conducting, non-magnetic mass held against the disc 40 by repulsion.

Fig. 9 shows an inducing coil 42 and 43 is a ring of conducting material fitting tightly on the coil 42. The ring 43 could also be a coil and the roll or coil 44 of wire or the like is attracted to the ring. This form, with the attractor as the outer element, is applicable to hollow or concave forms, but apparently not to sheets.

In Fig. 10 a short circuited ring 47 with opening 48 is wedged or fastened in a sleeve 46 of a plastic material which fits tightly into the opening of the inducing coil 45. The conducting mass 49 is lifted from a position with its center near or above the mid-plane of coil 45.

In Fig. 11, the inducing coil 50 has an internal collar or frame 51 of a phenolic condensation product or the like and to which a sheet or plate 52 of aluminum or copper is fastened by screws or other suitable means. A sheet 53 of conducting material is attracted to and is held against the plate 52. This form of the invention may be of square or rectangular configuration in order that this magnet may be useful in lifting rectangular sheets.

The movable coil 54 of Fig. 12 is suspended by a wire or string 55. The coil 56 and coil 58 are separated by a spacer 57 of wood or other non-magnetic, non-conductor to hold the coils together. Flexible connections carry the current to the coil 54.

In Fig. 13 an electromagnet is shown for picking up a plurality of pieces and articles such as aluminum pots and pans indicated by reference numeral 65. The coils 59, 63, 62, 61 and 64 are arranged concentrically as shown and a rope or wire 60 holds the magnet suspended. Flexible leads, not shown, will carry the current to the electromagnetic coils. Coils are connected to have the instantaneous polarities indicated. Coils 63, 62, and 64 may be either short circuited or connected to oppose coils 59 and 61.

In Fig. 14 the primary inducing coil 66 has a secondary coil or attractor 67 which may be a solid mass of copper, aluminum or the like, such as a thick walled piece of tubing, or it may comprise a coil of wire wound or connected so as to oppose, but not to overcome the effect of coil 66, or it may be a short circuited coil.

The iron core and yoke is shown in three parts, a central core 70 of iron wires, a layer of iron wires 69 between the inner and outer coils, and a third layer of iron wires 68 over the outer surfaces of the outer coil 66. The assembly is held together by tape or cord covering 71.

The ends of the iron wires comprising the core or magnetic circuit project at one end and are bent over on each other in the manner of the old style "hedgehog" type transformer.

An object 72 is shown in dotted outline, being held against the attractor. This object is a non-magnetic conductor, though of course it can be magnetic as the magnet will also attract iron. The attraction for iron is much greater than the attraction for silver, copper, gold, aluminum, etc.

In Fig. 15 a thin layer of iron is shown as part 36a between the primary 15 and the secondary 17a. This serves to partially shield the secondary from the primary and so reduces heating of the secondary.

Fig. 5b shows a wiring diagram in which the attractor is connected in parallel opposition with the primary circuit through an adjustable resistor 73. In Fig. 5a the switching means is also shown as a rheostat so that provision can be made for varying the phase of the current in the attractor to be more nearly in phase with the current induced in the armature.

The device is susceptible to many modifications, as to arrangement of parts, and there are intermediate steps between the arrangement of iron shown in Figs. 6 and 14.

It is, of course, obvious that in all the forms of the invention the coils, that is, the electromagnets may be circular, rectangular, square or any other desired shape.

As to the attractive properties of the electromagnet the following is observed. As shown in Fig. 1, for instance, the armature 18 may also be subject to a repulsive force from coil 15, since the currents in 18 are generally opposite to the currents in 15. (Part 17 also experiences a force due to coil 15, but is fixed in position.) However mass 18 is to be of such a size and shape with respect to parts 15 and 17, that the attractive force between 18 and 17 predominates over the repulsive force between 15 and 18 so that the net result is an attraction between 18 and the combination structure. This is possible due in part to the fact that the repulsion between 15 and 18 is exerted at a disadvantageous angle as long as the armature is close to attractor 17 and does not extend too far over into the influence of coil 15.

There is a strong centering force driving the armature to a central position if it is of such dimensions as to have its periphery substantially of the same or lesser dimensions as the periphery of 17. If the attractor is smaller in dimension than is needed to fill the space of the coil opening, mass 18 may somewhat exceed part 17 in peripheral dimensions especially if part 18 be thin. In the form shown in Fig. 1, if part 18 is larger than part 17, it is repelled, and if it is approximately of the same peripheral dimensions as 17 but is not closely adjacent thereto, it is also repelled, so that it will be seen that the object should be adapted to the field, and that in most operations the magnet will be placed in fairly close proximity to the object to be attracted or vice versa. However it is possible to make the armature "jump" an appreciable distance to affix itself to the attractor, for example, by having the primary of relatively large peripheral dimensions compared to the secondary (where the attractor is the inner element).

The apparatus as shown in Fig. 12 also affords means for demonstrating novel phenomena, for using very thin coils as shown in this figure, and having coil 54 short circuited and disposed in the resultant field of coils 56 and 58 which are supplied with alternating current, and connected so as to oppose each other, it can be shown that the coil 54 is repelled when close to 58, attracted when at a somewhat greater distance, and again repelled at a still greater distance. Specifically, when 56 is double the mean diameter of 58, but of the same number of turns, and 54 is of the same dimensions and turns as 58, critical points are found such that if 54 and 58 are separated by less than about six-tenths or more than one and two-tenths their radius the armature is repelled, but at intermediate separations 54 is attracted toward 58. This inner repulsion will be observed only when the coils are so thin that their centers may approach within the inner critical point. The points may be found theoretically by computing the mutual inductances between 58 and 54 and between 56 and 54 at different spacings and noting the sign of the current in 54, which will be opposite to that of the current in the coil with which coil 54 has the greater mutual inductance at the particular spacing. Then the axial component of forces may be likewise computed, with appropriate signs, so that the sign of the resultant force may be determined, that is whether attraction or repulsion. In most practical applications it is anticipated that the design will be such that the question of an inner repulsion zone need not arise. For example it does not arise when the attractor is a short circuited coil or solid mass.

The form in which the secondary is connected so as to exactly oppose the primary has proved inferior to the forms in which the secondary has current induced in it or some means for adjusting the phase of the secondary current. This is attributed to the circumstance that current induced in the armature is not exactly opposite in phase to the primary current and hence will not be exactly in phase with the current in the secondary if the secondary is fed in exact opposition to the primary. If the current in the secondary is induced it is more nearly exactly in phase with the current in the armature, and maximum attraction results. The secondary circuit may be modified so as to afford a comparable phase lag. One way of accomplishing this is to connect the secondary in parallel opposition with the primary but with the provision of a resistor in series with the secondary, as in Fig. 5b.

The attracted object is usually referred to as an armature, and the part of the electromagnet structure to which it is attracted is termed the attractor, as the usual term "pole" employed in other magnet devices does not seem entirely apt.

As a specific embodiment there has been provided, among other forms, a coil of 156 turns of flat copper conductor the substantial equivalent of #9 B and S gauge, with a depth of 2 inches and aperture 2 and 3/8 inches, overall dimensions 5 and 3/4 inches, weight seven pounds. Using the arrangement of Fig. 1, part 17 is an aluminum cylinder 2 inches in diameter and 2 inches long, and the surface of the attractor 17 is generally flush with the surface of the winding. With the coil 15 connected to a 60 cycle supply circuit, 47 volts impressed, and about 50 amperes flowing this electromagnet will pick up a silver dollar from a flat surface. It also picks up a silver half dollar, and by trial with smaller coins with the apparatus turned over it is seen that strong centering and attractive forces are exerted on smaller silver and copper coins, though an undesirably large current would be required to lift the smaller coins. An aluminum disk 2 inches in diameter and about 1/2 inch thick is securely held and lifted by the magnet. This disk is however repelled if held at a distance greater than about 1/2 inch from the attractor face. A disk of aluminum 3 inches diameter, 1/2 inch thick is strongly repelled, as is a copper disk 4 inches diameter and 1/8 inch thick. Small scraps of aluminum are attracted. A cube of aluminum 1 1/2 inches on each edge suspended near the attractor face (with the magnet now turned on its edge) may be attracted, as also an aluminum sphere 1 3/4 inches diameter, a cylinder 1 3/4 inches diameter and 2 inches long and a gold signet ring. The gold ring suspended near the attractor turns so as to have its plane parallel to the plane of the coil. This behavior is noted with coins, as well, and is quite different from the behavior of rings or disks placed in a simple alternating current field, for if the attractor were not there to exercise its influence the disk or ring would turn so as to place its plane perpendicular to the plane of the inducing coil.

In another form, a coil of 724 turns of #18 enameled copper wire wound to leave an aperture of 3 inches, an aluminum ring 3 inches in diameter and 1 1/2 inches thick is used as an attractor. The aperture in the ring (Fig. 6) is 1 1/4 inches in diameter. Into this core space the section of iron laminations 36 is employed when desired. With 270 volts impressed and approximately 12 amperes a silver dollar can be picked up, and will jump about 1/2 inch to reach the attractor, and an aluminum cup measuring 2 7/8 inches across and 3 inches deep, and having a projecting handle, is picked up, either by the top or bottom. With this primary coil, a secondary of 305 turns of #18 enameled wire was provided as attractor replacing the aluminum ring. The outer diameter of the attractor coil was 2 1/2 inches, and the inner opening 1 1/2 inches. The axial length of the coil was 1 1/2 inches. With the attractor coil short circuited and the aperture filled with a magnetic core, the assembly showed attractive force on a dollar when nearly an inch from the face of the core, (the core just filled the opening in the attractor coil) and held the coin firmly with about 15 amperes flowing in the outer coil, 270 volts impressed, with an attractor coil of 600 turns of #20 wire, having an aperture of 1 1/2 inches and fitting into the opening of the inducing coil connected to the supply circuit in parallel opposition to the primary but with a resistance of 12 ohms in series, the coin and coil of wire were attracted but somewhat less strongly than with the attractor short circuited. A condenser has also been used. With the aluminum ring again the attractor the zone of attraction has been explored and roughly defined. With 220 volts impressed on the primary coil (764 turns) a roll of 75 feet of bare 22 guage copper wire was attracted and firmly held. By suspending various objects of different sizes at different separations, it was found that a region or zone of attraction exists somewhat conical in shape such that a conducting object placed so that its principal conducting path is within this cone, is attracted. The cone may be described as having in this case a base substantially fitting over the face of the attractor and a vertex on the axis at a distance from the attractor approximately equal to the diameter of the cone. The outside diameter of the coil is 5 5/8 inches and the thickness 1 1/2 inches. With the inner coil energized and the outer coil short circuited a roll of copper wire 4¼ inches in diameter was attracted to the outer coil. Here the zone near the inner coil is a zone of repulsion.

In a smaller coil of 206 turns of #12 copper wire, weighing three pounds, using a solid aluminum cylinder 1¼ inches diameter, and 1¼ inches long as the attractor, a silver half dollar is held and likewise a silver quarter dollar, with about 50 amperes flowing. This coil has an opening of 1½ inches, winding depth 1⅝ inches and overall diameter 4⅛ inches.

It is evident that by using larger wire the heating of the coils may be lessened. In some work it may be desirable to provide for cooling the coil or the attractor or both, by such means as circulating a cooling medium through the coils which may be in the form of hollow tubing. For prolonged use without cooling heat insulating material such as mica may be interposed between the attractor and the coil.

It will be understood of course that the energizing current must be sufficient in value to produce the necessary attractive force in order to lift or attract the armature when the armature is within the attracting range. If force is lost through increased resistance of the parts caused by heating, increased current may be required to compensate.

The "range" of the electromagnet is the distance within which a mutually attractive force is exerted. At separations near the extreme range the current must be relatively strong in order to cause the object to be pulled to the magnet.

The figures given for current values in specific cases have been for 60 cycles, but other frequencies may be employed, and with smaller sizes it is especially advantageous to use a higher frequency current. A frequency of about 400 cycles has been used with good effect.

In general the effectiveness of the device increases with size, when a commercial power frequency such as 60 cycles is employed. In some instances it is desirable to provide static condensers to relieve the supply line of some of the wattless current burden.

By having a switching means in the secondary circuit as indicated in Fig. 5a and 5b, a selective action is secured and the device may be used for sorting magnetic from non-magnetic conducting material. By leaving the secondary open the magnetic material can be taken up from a pile and transferred where it is wanted and then when no more magnetic material remains in the pile, the switch is closed making the magnet operative on nonmagnetic conductors, and then that material moved to a designated place.

To sum up it is shown that a conducting object of suitable dimensions, placed in sufficiently close proximity to a source of alternating current flux compounded of two substantially opposing fields about a common axis of symmetry, is attracted toward the source of the compound field, experiences also a centering force, and experiences a force tending to hold a plane of the armature parallel to the plane of the face of the field producing means. The zone of attraction is roughly defined as the region bounded by a cone with its base in the plane of the attractor face, and vertex on the common axis of the field producing means.

As to the actual uses of electromagnets according to this invention may be mentioned (a) as a demonstration device (b) in larger size for handling sheets, or ingots of metal, or large scrap, and also wire coils, (c) in a differential relay in which the moving element is suspended and provided with contacts so as to be differential in action in accordance with the distance from the structure carrying the coils.

Coil 15, 23, etc. is connected to an A. C. source, and part 17, 21, etc. (which may be a short circuited ring or disk) reacts on the mass 18, 22, etc. due to a field created by an electric current induced in the coil 17, 21, by the coil 15, 23.

The phenomenon of a conducting body displaying an attractive or repulsion force differentially according to its axial distance from a coil structure can also be shown with direct currents by apparatus in the form shown in Fig. 12. Here 56 is a coil of some 400 turns of #20 enameled wire, which may be provided with taps in order to vary the ratio of turns, coils 58 and 54 are composed of about 200 turns of the same wire. Coils 56 and 58 are fixed to each other and coil 54 is suspended by strings or wires from an overhead support. A direct current is led through all the coils which may be in series, coil 54 obtaining current through flexible leads. The thickness of each coil is about ⅜ inch. The coils are connected so as to have the polarities indicated, that is the current in coil 58 is opposite to the current in 56, while the current in 54 is in the same direction as the current in 58. The mean diameter of 58 and 54 is $2\frac{1}{16}$ inches, and the mean diameter of coil 56 is about 4⅝ inches, of twice as many ampere turns as the inner coil 58, it is found that when coil 54 is close to 58 with a clearance of about ¼ inch, that is a separation of the mid planes of the coils of ⅞ inch, the coil 54 is strongly attracted to the coil 58. Now if the coil 54 is moved away, and the coils again energized it will be found that with a clearance of about 1½ inches there is a repulsive force between 54 and the assembly 56, 58. At an intermediate distance the combination of forces passes through a critical value changing from attractive to repulsion. The resultant forces can be computed by means of the derivative of mutual inductance between circular currents. The distance at which the change occurs can be conveniently regulated by varying the number of turns in one or both coils. If 56 is given too great a preponderance, then the zone of attraction diminishes and finally there is the situation in which coil 54 may not be attracted even when in contact with 58, while on the other hand if coil 54 has insufficient ampere turns the situation is the same as though it were not there, that is there is only attraction between 58 and 54. If 56 is not energized, but 58 and 54 are, then of course there is only attraction.

While there is similarity in actions as to forces with certain values and signs of currents flowing in the different members, the action with alternating currents which are relied on to make an effective alternating current electromagnet for non-magnetic substances differs from the foregoing in that mutually inductive action is depended on in the alternating current case to produce the current in the armature, and member 54 generally has no electrical connection with any circuit being simply a short circuited mass and member 58 may also be simply a short circuited mass or coil. If 54 is made of a solid conducting non-magnetic mass in the direct current experiment it is unaffected (except by a transient on opening or closing the circuit) and the same is true if 58 is a solid conducting non-magnetic mass.

Referring again to the experiment with direct current in which the coil 54 is placed at different positions on the axis at moderate clearances, there is noted at some separations a twisting of 54 tending to turn its plane out of parallelism with 56 and 58. The behavior in this respect is somewhat the same as that of a single short-circuited coil or ring in the influence of an alternating current field.

It will be noted that to be operative on small particles, the structural dimensions must be greatly reduced and the operating frequency greatly increased.

The embodiments are to be taken as illustrative of my invention and not as limitations thereon.

What is claimed is:

1. In an electromagnet, a closed conductor, an armature of non-magnetic conducting material adjacent thereto, and an inducing coil means surrounding the closed conductor whereby alternating currents of substantially the same phase are induced in both the closed conductor and armature, the armature being of such size and shape and so positioned as to be attracted to the closed conductor by electromagnetic flux forces.

2. An electromagnet comprising means for producing an alternating flux field, a second means fixed to the first mentioned means for producing an alternating flux field generally symmetrical about the same axis but generally opposing the field produced by the first mentioned means in the region of the common axis, and an armature entirely of non-magnetic conducting material disposed in the resultant field, said armature being so dimensioned with respect to the resultant field as to be held to the magnet by attracting electromagnetic forces.

3. An electromagnet comprising a primary inducing coil, a short circuited secondary combined therewith to form a substantially unitary structure, and an armature of non-magnetic conducting material adhering to said secondary by attracting electromagnetic forces arising from current circulated within the armature by induction.

4. An electromagnet of the tractive type comprising means for producing an alternating flux field, a second means fixed in position relative to the first means for producing an alternating flux field generally symmetrical about the same axis but generally opposing the field produced by the first mentioned means in the region of the common axis, and an armature of non-magnetic conducting material disposed in the resultant field, said armature being so dimensioned and so positioned in the resultant field that the armature is attracted axially toward the electromagnet.

5. An alternating current electromagnet comprising inducing means, attracting means fixed in position relative to the inducing means, and a member of non-magnetic conducting material held to the attracting means by axially attracting and laterally centering forces caused by interaction of fluxes of alternating currents flowing in the attracting means and of currents circulated within said member by induction.

6. An electromagnet, according to claim 5, in which a core of ferromagnetic material is provided which passes through an opening in the attracting means.

7. Attraction-repulsion apparatus comprising a primary inducing winding, a secondary winding, control means for opening and closing said secondary winding, and an armature of non-magnetic conducting material positioned and dimensioned so as to be repelled when the secondary is opened and attracted when the secondary is closed.

8. Attraction-repulsion apparatus comprising a primary means for producing an alternating flux field, a second means combined therewith for producing a flux field generally coaxial with the first field but generally opposing the first field in the region of the common axis, and an armature of non-magnetic substance positioned and dimensioned so as to be repelled from the structure when the primary means only is operative and attracted axially toward the structure when both means are operative.

9. An electromagnet according to claim 4, including control means to render inoperative said second field producing means.

10. An electromagnet according to claim 5, including means for varying the phase of the alternating currents flowing in the attracting means.

WILLIAM V. LOVELL.